United States Patent [19]
Meyer, Jr. et al.

[11] 3,852,267
[45] Dec. 3, 1974

[54] PHOSPHORAMIDATES OF 3',5'-CYCLIC PURINE NUCLEOTIDES

[75] Inventors: Rich B. Meyer, Jr., Laguna Beach; Dennis A. Shuman, Mission Viejo; Roland K. Robins, Santa Ana, all of Calif.

[73] Assignee: ICN Pharmaceuticals, Inc., Pasadena, Calif.

[22] Filed: Aug. 4, 1972

[21] Appl. No.: 277,972

[52] U.S. Cl. .......................... 260/211.5 R, 424/180
[51] Int. Cl. ...................... C07d 51/52, C07d 51/54
[58] Field of Search ............................ 260/211.5 R

[56] References Cited
UNITED STATES PATENTS

| | | | |
|---|---|---|---|
| 3,575,958 | 4/1971 | Nagasawa et al. | 260/211.5 R |
| 3,712,885 | 1/1973 | Weimann et al. | 260/211.5 |

*Primary Examiner*—Johnnie R. Brown
*Attorney, Agent, or Firm*—Lyon & Lyon

[57] ABSTRACT

Exocyclic phosphoramidates of 3',5'-cyclic purine nucleotides are prepared by activation of nucleoside 3',5'-cyclic phosphates to nucleophilic attack by reaction with phosphorus oxychloride ($POCl_3$), followed by reaction with ammonia or an alkylamine. Unlike the cyclic phosphates themselves, the resulting compounds are non-ionic, for which reason lipid solubility (and hence cellular transport) is substantially enhanced. Furthermore, the compounds of the invention may be hydrolyzed under conditions obtaining in the gastrointestinal tract for metered production of the corresponding cyclic phosphates which, depending upon the particular aglycon, are biologically active in, e.g., kinase activation, adenyl cyclase inhibition, etc. Moreover, as compared to the cyclic phosphates themselves, the phosphoramidates are relatively stable toward decyclization, so that the phosphoramidates may serve as useful intermediates in otherwise difficult syntheses of biologically active cyclic purine nucleotides.

11 Claims, No Drawings

PHOSPHORAMIDATES OF 3',5'-CYCLIC PURINE NUCLEOTIDES

BACKGROUND AND SUMMARY OF THE INVENTION

As first reported by Sutherland, e.g., "Cyclic AMP" Ann. Rev. Biochem 37, 149 (1968), adenosine 3',5'-cyclic monophosphate acts as an intracellular "second messenger" mediating many of the actions of a variety of different hormones. Thus, first hormone messengers influence adenyl cyclase contained at or within cell walls to intracellularly form cyclic AMP from adenosine triphosphate upon receipt of the extra-cellular hormone signal. The formed cyclic AMP in turn stimulates intracellular functions particular to the target cells of the hormone. Cyclic AMP has been shown to activate protein kinases which in turn occasion physiological effects such as muscle contraction, glycogenolysis, steroidogenisis and lipolysis. The naturally occuring guanosine 3',5'-cyclic monophosphate (cyclic-GMP) has since been shown to activate other protein kinases. In the wake of these discoveries, numerous analogs of these 3',5'-cyclic purine nucleotides have been prepared with substitution variously at the 2-, 6- and 8-position of the purine aglycon calculated to improve one or more properties exhibited by their naturally occuring analogs. Thus, resistance to phosphodiesterase degradation, phosphodiesterase inhibition, increased specificity of kinase activation and other desirable properties have resulted. See, e.g., Robins et al U.S. application Ser. No. 97,015 filed Dec. 10, 1970, and now abandoned, for "8-Substituted Cyclic Purine Nucleotides," Shuman et al application Ser. No. 234,371 filed Mar. 13, 1972, and now abandoned, for "6-Substituted Purine Nucleotides," Shuman U.S. application Ser. No. 201,157 filed Nov. 22, 1971 for "2,6-Disubstituted Purine Cyclic Nucleotides" and Boehringer Great Britain Pat. No. 1,257,546, the disclosures of all of which are incorporated herein by reference in order to illuminate the background of this invention.

In the course of attempting to form the compound 6-diethylamino-9-(β-D-ribofuranosyl)purine 3',5'-cyclic monophosphate by conversion of inosine 3',5'-cyclic monophosphate (cyclic-IMP) to the corresponding 6-chloropurine cyclic nucleotide with $POCl_3$ followed by reaction with diethylamine, we obtained an unexpected highly mobile and crystallizable product which proved to be a diethylphosphoramidate. Apparently $POCl_3$ had activated the phosphate moiety to nucleophilic attack by amine, as by formation of one or both of a phosphochloridate or pyrophosphodichloridate intermediate. Earlier, purposeful attempts to activate the phosphate moiety with, e.g., thionyl chloride, dicyclohexylcarbodiimide and diphenylphosphochloridate had failed. In any event, the reaction scheme thus come upon has now proved general to the production of a novel class of compounds, viz, exocyclic phosphoramidates of 3',5'-cyclic purine nucleotides. Until this point, the literature of which we are aware contained reference to but a single exocyclic phosphoramidate of any 3',5'-cyclic ribotide, ie., the uracil 3',5'-cyclic N-phenylalanylphosphoramidate reported by Preobrazhenskaya, Dokl. Akad. Nauk SSSR 174 (1), 100-3 (1967) [See C.A. 68, 1292 (1968)]. Unlike the case of the compounds of this invention, the phosphate ester bonds of that biologically inactive pyrimidine 3',5'-cyclic phosphoramidate are said to be less stable and hence more subject to acid hydrolysis than the P-N bond. The compounds of this invention uniformly hydrolyze to the phosphate without ring cleavage, so that bioactive cyclic-AMP and analogs thereof may be depoted for metered release following administration. The manner in which this and other objects and advantages of the invention are obtained will be clear from the description of preferred embodiments which follows.

DESCRIPTION OF THE PREFERRED EMBODIMENTS

The 9-(β-D-ribofuranosyl)purine 3',5'-O,O-cyclic phosphoramidates preferred in the practice of this invention are those arising from the precursors cyclic-AMP, cyclic-IMP and cyclic-GMP, as exemplified by the reaction schemes set out below:

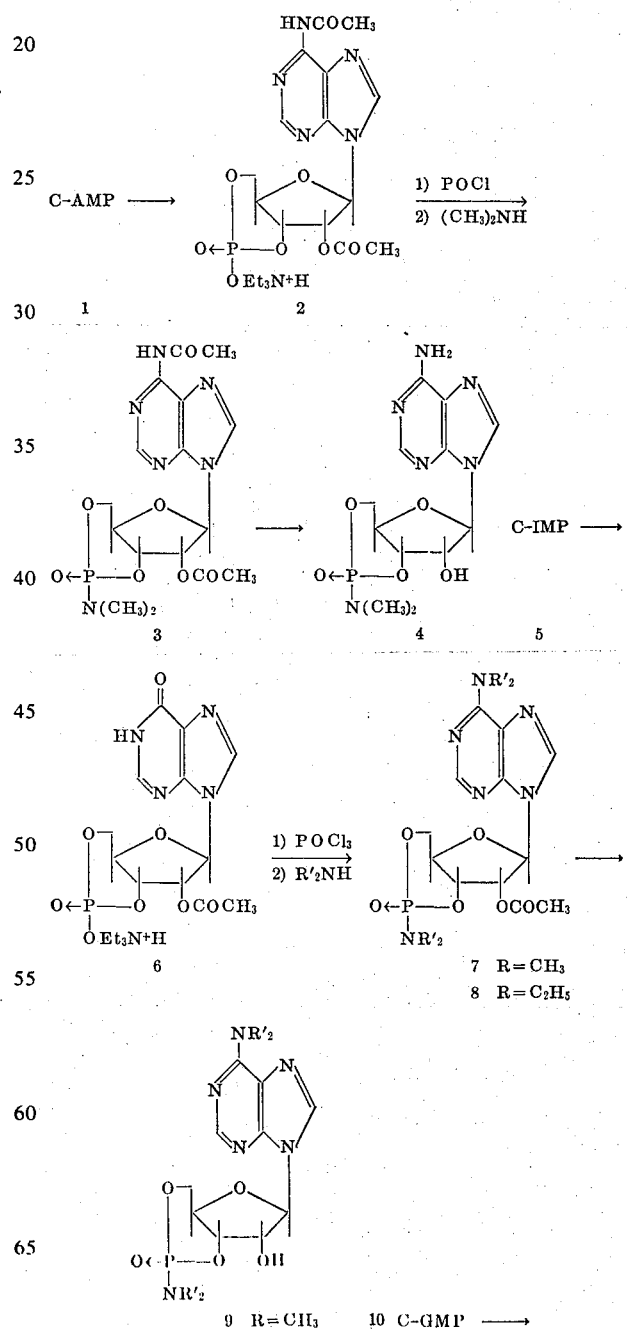

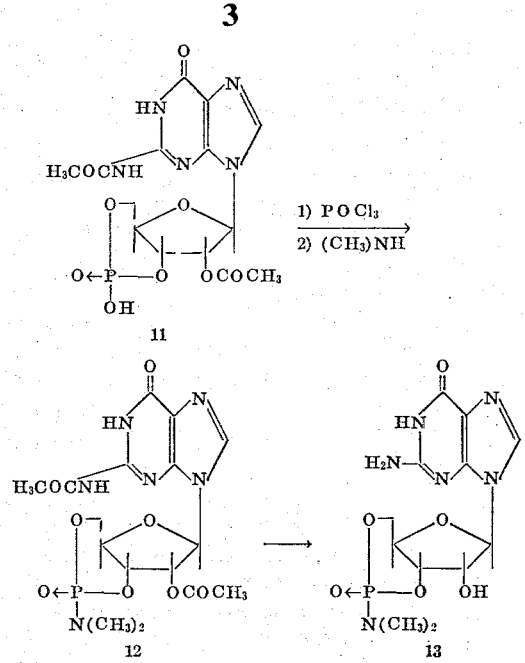

The first step in each case is acylation in conventional fashion, as by reaction with acid halide or anhydride, which has the effect of increasing solubility and, more importantly, preserving the 2'-O position against attack by POCl₃. The acylated intermediate is preferably obtained and employed in the form of a salt like the triethylammonium salts 2 and 6, although free phosphate may also serve, as occurs in the case of 11. In the case of cyclic AMP and cyclic GMP, acylation of the 2'-hydroxyl group generally also effects acylation of the amino group carried by the purine aglycon, a matter of no moment inasmuch as the N-acyl group is later removed as the 2'-O position is deblocked or may be enzymatically cleaved together with the glycosyl acyl group following administration of the blocked compounds.

Heating the blocked product with POCl₃ followed by reaction of the assumed phosphochloridate or pyrophosphodichloridate intermediates yields the correspondingly blocked phosphoramidates. In the case of C-IMP, at elevated temperatures a symmetrical dialkylamino compound is formed (eg, 7, 8), whereas at lower temperature (for example, less than about 70°C) the inosine 3',5'-cyclic phosphoramidate is the expected product. The acyl-blocked phosphoramidates may be recovered and administered as such or may alternatively be deblocked as with methanolic ammonia to afford the free phosphoramidate compound.

Essentially any acyl group may be employed for blocking and in aid of solubility. Thus, for example, each of the groups adamantoyl, butyryl, hexanoyl, octanoyl, lauroyl, stearoyl, palmitoyl, acetyl and benzoyl have previously been employed as blocking groups in reactions involving cyclic-AMP analogs, the latter two being preferred from the standpoint of cost and availability.

In the case where $R_1$ or $R_2$ of the cyclic phosphoramidate moiety $PO_3NR_1R_2$ are other than hydrogen, convenience dictates but criticality does not demand they be lower alkyl (eg, $C_1$-$C_5$, preferably $C_1$-$C_3$ alkyl). $R_1$ and $R_2$ may also be alkyl groups joined, e.g., through carbon in the case of piperidinyl or oxygen in the case of morpholinyl groups, to form a 6-membered heterocyclic ring.

Since bioactivity of the phosphoramidates largely awaits hydrolytic scission of the P-N bond to reestablish the active cyclic phosphate precursor, apt choice of amine reactant permits control of the time over which the active cyclic phosphate will be converted from its depot or phosphoramidate form following administration. For example, N,N-dialkylphosphoramidates such as 4 and 13 when hydrolyzed in pH 3 buffer at 50° C for 15 hours gave approximately 41 percent hydrolysis, principally to adenosine 3',5'-cyclic phosphate. Monoalkylphosphoramidates are substantially more subject to hydrolysis while those obtained by reacting the activated phosphate with ammonia (ie, cyclic $PO_3NR_1R_2$'s where $R_1$ and $R_2$ are each hydrogen) hydrolyze still more readily. Again, choice of amine reactant may be governed in part by the intended mode of administration. For example, in the case of systemic employment, those skilled in the art may choose amine reactants calculated to impart an optimal balance of lipid and serum (aqueous) solubility.

Hydrolysis tests conducted thus far under pH conditions obtaining in the stomach are persuasive of the slow release advantage of the dialkylphosphoramidates relative to cyclic phosphates themselves. Whether significant quantities of these phosphoramidates will, when orally administered, pass into the bloodstream in unhydrolyzed form remains to be seen. Best transport advantage of the non-ionic character of the phsophoramidates of the invention, then, may likely arise upon parenteral or topical administration wherein it is expected that the active cyclic phosphates will devolve from enzymatic cleavage of the P-N bond in vivo.

As observed above, the specific activity of particular phosphoramidates will reflect that of its corresponding cyclic phosphate. It is worthy of note, however, that compound 8 is the first of many nucleotides tested to date which has inhibited adrenal kinase activity, exhibiting 50 percent kinase inhibition in concentrations between 0.1 and 0.5 mM.

In addition to depot employments, phosphoramidation may be practiced to enhance solubility of cyclic nucleotide intermediates in organic media during substitutive operations on the aglycon aimed at production of bioactive cyclic AMP analogs, and may also be employed as a blocking mechanism to prevent phosphate decylization during such reactions. For example, cyclic phosphate cleavage in the POCl₃ conversion of guanosine 3',5'-cyclic phosphate to the useful intermediate 2-amino-6-chloro-9-(β-D-ribofuranosyl)purine 3',5'-cyclic phosphate may be greatly reduced by chlorinating the aglycon of a phosphoramidate, then hydrolyzing to regain the cyclic phosphate moiety.

The invention is further illustrated in the examples of preferred embodiments which follow.

EXAMPLE 1

Adenosine 3',5'-Cyclic N,N-Dimethylphosphoramidate (4)

A suspension of $N^6$,2'-O-diacetyladenosine 3',5'-cyclic phosphate triethylammonium salt (2) (2.5 g, 67 mmole) in 20 ml of phosphoryl chloride was refluxed for 10 min and immediately evaporated in vacuo at 50° to a syrup. A solution of 40 ml isopropyl alcohol and 10 ml of 40 percent aqueous dimethylamine at −50° was added to the syrup. The resulting solution was stirred at room temperature for 18 hours and evaporated in vacuo at 30° to a syrup. The syrup was dissolved in a minimum amount of methanol and added to a silica gel column (3.7X40 cm, Baker No. 3405, packed in chloroform). The column was washed with one liter of chloroform and then methanol-chloroform (3:97) to remove after evaporation of solvent in vacuo, 600 mg of material which exhibited no electrophoretic mobility at pH7. The material was dissolved in 50 ml of methanol-ammonia (saturated with ammonia at 0°) and stored at room temperature in a bomb for 7 days. The methanolic solution was evaporated in vacuo at 30° to a syrup. The syrup was dissolved in a minimum amount of methanol and added to a silica gel column (2.5X21 cm, Baker No. 3405, packed in chloroform). The column was eluted with methanol-chloroform (1:9) and the appropriate fractions evaporated in vacuo at 30° to a syrup. The syrup was dissolved in 5 ml ethanol and the solution set at room temperature. The crystals which formed were filtered and dried for 8 hours at 82°, over $P_2O_5$, in vacuo, to give 100 mg of adenosine 3',5'-cyclic N,N-dimethylphosphoramidate.

Anal. Calcd for $C_{12}H_{18}N_6PO_5 \cdot \frac{1}{2}H_2O$: C, 39.45; H, 4.96; N, 23.00. Found: C, 39.24; H, 4.75; N, 22.78.

EXAMPLE 2

6-Diethylamino-9-(2-O-Acetyl-β-D-Ribofuranosyl)purine 3',5'-Cyclic N,N-Diethylphosphoramidate (8)

A mixture of 3.0 g (6.35 mmole) 6 and 15 ml $POCl_3$ was refluxed 15 min, then evaporated in vacuo. The residue was taken up in 200 ml $CH_2Cl_2$ and washed with ice water and the organic phase was filtered through a pad of $MgSO_4$. The filtrate was chilled and added to a cold solution of 100 ml i-PrOH and 20 ml $Et_2NH$ and allowed to stand 3 days at ambient temperature, then evaporated. The residue was extracted with $CHCl_3$ and this solution, after concentration, was applied to a 250 ml column of silica gel packed in $CHCl_3$ and eluted with the same solvent. Fractions containing 8 were evaporated; crystallization from EtOH-heptane gave 0.35 g (11 percent).

Anal. Calcd for $C_{20}H_{31}N_6O_6P$: C, 49.78; H, 6.48; N, 17.42. Found: C, 49.33; H, 6.67; N, 17.05.

EXAMPLE 3

6-Dimethylamino-9-(β-D-Ribofuranosyl)purine 3',5'-Cyclic N,N-Dimethylphosphoramidate (9).

Cyclic IMP (5.0 g, 14.4 mmoles) was acetylated, then refluxed 30 min with 50 ml $POCl_3$. The solution was cooled and poured into 500 ml heptane. The supernatant was decanted and the residue was taken up in 250 ml $CHCl_3$ and washed with 2 X 100 ml cold $H_2O$. The organic phase was evaporated in vacuo, and an ice cold solution of 50 ml 40 percent aqueous dimethylamine in 150 ml EtOH was added and stirred overnight. After evaporation, the product was precipitated by addition of $H_2O$. Recrystallization from EtOH gave 1.1 g (20 percent), mp 264°–265° (dec).

Anal. Calcd for $C_{14}H_{21}N_6O_5P$: C, 43.75; H, 5.51; N, 21.87. Found: C, 43.53; H, 5.70; N, 21.69

EXAMPLE 4

$N^2$,2'-O-Diacetylguanosine 3',5'-Cyclic Phosphate (11)

A mixture of 30 g (68 mmole) cyclic GMP.4 $H_2O$, sodium salt, 100 ml acetic acid, and 200 ml acetic anhydride was refluxed with stirring 2.5 hr, by which time solution had occured. After evaporation, the residue was dissolved in 250 ml $H_2O$ and allowed to stand 8 hr. The $N^2$-acetylguanine that crystallized was filtered and the filtrate was percolated through a column containing 250 ml Dowex 50 × 8 ($H^+$ 100–200 mesh). Evaporation of eluate containing product and recrystallization of the residue from MeOH gave 17.7 g (60 percent).

EXAMPLE 5

$N^2$,2'-O-Diacetylguanosine 3',5'-Cyclic N,N-Dimethylphosphoramidate (12)

A mixture of 2.0 g (4.6 mmole) 11 and 15 ml phosphoryl chloride, protected from moisture, was surrounded by an oil bath maintained at 70° and stirred 30 min. The resulting solution was poured into 200 ml heptane. After setting, the liquid was decanted and 50 ml i-PrOH and 50 g ice was added to the residue. To this mixture was immediately added, dropwise and with stirring, an ice-cold solution of 100 ml i-PrOH and 20 ml 40 percent aqueous dimethylamine. After 1 hr. stirring at 0°, the solution was partitioned between 500 ml $CHCl_3$ and 300 ml $H_2O$. The organic phase was washed with 0.1 N HCl, dried ($MgSO_4$), and evaporated. Recrystallization of the residue gave 0.52 g (25 percent).

Anal. Calcd for $C_{16}H_{21}N_6O_8P$: C, 42.11; H, 4.64; N, 18.42. Found: C, 42.05; H, 4.89; N, 18.19.

EXAMPLE 6

Guanosine 3',5'-Cyclic N,N-Dimethylphosphoramidate (13)

A solution of 0.48 g (1.05 mmole) 12, and 20 ml MeOH, and 5 ml conc $NH_4OH$ was refluxed 5 hr, then evaporated. Recrystallization of the residue from MeOH gave 0.28 g (70 percent).

Anal. Calcd for $C_{12}H_{17}N_6O_6P \cdot \frac{1}{2} H_2O$: C, 37.80; H, 5.02; N, 22.04. Found: C, 37.93; H, 4.74; N, 21.81.

EXAMPLE 7

$N^2$,2'-O-Diacetylguanosine 3',5'-Cyclic Phosphoromorpholidate

A mixture of 2.5 g $N^2$,2'-O-diacetylguanosine and 20 ml $POCl_3$ was heated and precipitated as described in Example 5. The residue was taken up in 100 ml $CHCl_3$ and cooled to 0°. To this solution was added 10 ml morpholine dropwise at a rate which allowed the temperature to be maintained at 5° with ice cooling. The solution was extracted with 3 × 100 ml portions of water, then dried and evaporated to give the desired product.

EXAMPLE 8

$N^6$,2'-O-Diacetyladenosine 3',5'-Cyclic Phosphoramidate $N^6$,2'-O-Diacetyladenosine 3',5'-cyclic phosphate triethylammonium salt (2.1 g) was stirred in a refluxing solution of phosphorus oxychloride (25 ml) for 6 minutes. The solution was evaporated in vacuo (50° C) and the residue stirred in 200 ml of chloroform. The chloroform solution was decanted and extracted with 1 × 50 ml ice-water, 1 × 50 ml saturated sodium bicarbonate (0° C). The organic layer was dried with anhydrous sodium sulfate and cooled to −70° C. Dry ammonia gas was bubbled into the organic layer for 5 minutes and the resulting organic layer was evaporated. The residue was dissolved in a mixture of chloroform-water. The chloroform layer was separated and dried over sodium sulfate. The residue was dissolved in a minimum amount of chloroform and added to a silica-gel column (2 × 23 cm packed in chloroform). The column was washed with 1 liter chloroform and then chloroform-methanol (9:1) to remove $N^6,2'$-O-diacetyladenosine $3',5'$-cyclic phosphoramidate. Thin-layer chromatography on Merck Silicar 7GF with development by chloroform: methanol (8:2) gave $R_f$-$N^6,2'$-O-diacetyladenosine $3',5'$-cyclic phosphoramidate = 0.7; $R_f$-$N^6$, $2',O$-diacetyladenosine $3',5'$-cyclic phosphate triethylammonium salt = 0.3.

TABLE 1

Chromatographic mobilities on E. Merck Silica Gel F-254 precoated glass plates

| COMPOUND | A | $R_f$* | B |
|---|---|---|---|
| Adenosine 3',5'-cyclic N,N-dimethylphosphoramidate | 0.80 | | 0.35 |
| $N^2,2'$-O-diacetylguanosine 3',5'-cyclic N,N-dimethylphosphoramidate | — | | 0.78 |
| Guanosine 3',5'-cyclic N,N-dimethylphosphoramidate | 0.52 | | 0.07 |
| $N^2$,2'-O-diacetylguanosine 3',5'-cyclic phosphomorpholidate | 0.92 | | 0.69 |

*$R_f$ in solvent systems A (CHCl₃/MeOH:4/1 v/v) and B (CHCl₃/MeOH:10/1)

Having described our invention with especial reference to the preferred embodiments thereof, we wish it understood that the invention is not limited thereto, but only to the lawful scope of the appended claims.

We claim:

1. A 9-($\beta$-D-ribofuranosyl) purine $3',5'$-cyclic phosphoramidate of structure

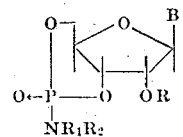

wherein R is hydrogen or acyl, B is adenine, guanine or, when R is acyl, $N^6$-acyladenine or $N^2$-acylguanine, and wherein $R_1$ and $R_2$ are alkyl groups joined to form a six-membered heterocyclic ring or, independently, hydrogen or $C_1$–$C_5$ alkyl, each acyl moiety being $C_1$–$C_{18}$ acyl.

2. A compound of structure:

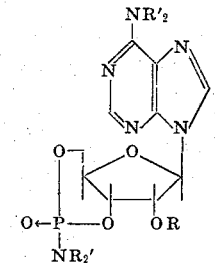

wherein R is hydrogen or acetyl and R' is methyl or ethyl.

3. A compound according to claim 2 wherein R' is ethyl.

4. Adenosine $3',5'$-cyclic N,N-dimethylphosphoramidate.

5. $N^2,2'$-O-diacetylguanosine $3',5'$-cyclic-N,N-dimethylphosphoramidate.

6. Guanosine $3',5'$-cyclic N,N-dimethylphosphoramidate.

7. $N^2,2'$-O-diacetylguanosine $3',5'$-cyclic phosphoromorpholidate.

8. $N^6,2'$-O-diacetyladenosine $3',5'$-cyclic phosphoramidate.

9. A $3',5'$-O,O-cyclic phosphoramidate of a 9-($\beta$-D-ribofuranosyl) purine nucleotide, the purine aglycon of said nucleotide being selected from the group consisting of adenine and guanine.

10. A phosphoramidate according to claim 9 whose purine aglycon is adenine.

11. A phosphoramidate according to claim 9 whose purine aglycon is guanine.

* * * * *